(12) United States Patent
Yang et al.

(10) Patent No.: US 12,737,248 B2
(45) Date of Patent: Sep. 15, 2026

(54) SYSTEMS AND METHODS FOR FAILURE WARNING

(71) Applicant: WUHAN UNITED IMAGING HEALTHCARE CO., LTD., Wuhan (CN)

(72) Inventors: Zhou Yang, Wuhan (CN); Baojun Wu, Wuhan (CN)

(73) Assignee: WUHAN UNITED IMAGING HEALTHCARE CO., LTD., Wuhan (CN)

( * ) Notice: Subject to any disclaimer, the term of this patent is extended or adjusted under 35 U.S.C. 154(b) by 123 days.

(21) Appl. No.: 18/596,602

(22) Filed: Mar. 5, 2024

(65) Prior Publication Data

US 2024/0211340 A1 Jun. 27, 2024

Related U.S. Application Data

(63) Continuation of application No. PCT/CN2022/116232, filed on Aug. 31, 2022.

(30) Foreign Application Priority Data

Sep. 6, 2021 (CN) ......................... 202111038933.6

(51) Int. Cl.
*G06F 11/07* (2006.01)

(52) U.S. Cl.
CPC ........ *G06F 11/079* (2013.01); *G06F 11/0793* (2013.01)

(58) Field of Classification Search
CPC ........................... G06F 11/079; G06F 11/0793
See application file for complete search history.

(56) References Cited

U.S. PATENT DOCUMENTS 11,531,319 B2 * 12/2022 Oota .................. G05B 19/4065
2004/0181712 A1 9/2004 Taniguchi et al.
(Continued)

FOREIGN PATENT DOCUMENTS

CN 103391185 A 11/2013
CN 106856508 A 6/2017
(Continued)

OTHER PUBLICATIONS

International Search Report in PCT/CN2022/116232 mailed on Nov. 28, 2022, 5 pages.
(Continued)

*Primary Examiner* — Jigar P Patel
(74) *Attorney, Agent, or Firm* — METIS IP LLC

(57) ABSTRACT

Systems and methods for failure warning are provided in the present disclosure. The methods may include obtaining, from the target device, log information including a first failure detection result and one or more first parameter values of one or more operation parameters of the target device. The first failure detection result may be generated by the target device and indicate whether the target device has a failure. The methods may further include determining, based on the one or more first parameter values, a second failure detection result regarding the target device. The methods may further include sending, to the user terminal, a failure analysis report regarding the target device based on the first failure detection result and the second failure detection result.

6 Claims, 8 Drawing Sheets

(56) References Cited

U.S. PATENT DOCUMENTS

| | | | | |
|---|---|---|---|---|
| 2014/0266713 | A1* | 9/2014 | Sehgal | G08B 23/00 340/540 |
| 2018/0174067 | A1* | 6/2018 | Spiro | G06F 30/20 |
| 2019/0376991 | A1* | 12/2019 | Rudorfer | G01N 35/00871 |
| 2021/0143987 | A1* | 5/2021 | Xu | H04L 63/062 |
| 2021/0343386 | A1* | 11/2021 | Loebig | G06N 20/00 |
| 2022/0164230 | A1* | 5/2022 | Braunstein | G06F 9/50 |

FOREIGN PATENT DOCUMENTS

| | | | |
|---|---|---|---|
| CN | 107040415 | A | 8/2017 |
| CN | 108322345 | A | 7/2018 |
| CN | 109842649 | A | 6/2019 |
| CN | 110209639 | A | 9/2019 |
| CN | 111452658 | A | 7/2020 |
| CN | 112163297 | A | 1/2021 |
| CN | 112463883 | A | 3/2021 |
| CN | 113032218 | A | 6/2021 |
| WO | 2005101741 | A1 | 10/2005 |
| WO | 2013026312 | A1 | 2/2013 |
| WO | 2023030391 | A1 | 3/2023 |

OTHER PUBLICATIONS

Written Opinion in PCT/CN2022/116232 mailed on Feb. 28, 2022, 5 pages.

First Office Action in Chinese Application No. 202111038933.6 mailed on Sep. 22, 2023, 20 pages.

Zhong, Jiang et al., Network failure prediction based on alarm log, Journal of Computer Applications, 36(S1): 49-53, 2016.

Quan, Pengyu et al., Research on Fault Detection Method for Resource Probe of Cloud Platform Virtual Machine, Computer Engineering & Software, 38(8): 134-141, 2017.

* cited by examiner

SYSTEMS AND METHODS FOR FAILURE WARNING

CROSS-REFERENCE TO RELATED APPLICATIONS

This application is a continuation of International Patent Application PCT/CN2022/116232, filed on Aug. 31, 2022, which claims priority to Chinese Application No. 202111038933.6, filed on Sep. 6, 2021, the entire contents of each of which are hereby incorporated by reference.

TECHNICAL FIELD

The present disclosure generally relates to device monitoring, and more particularly, relates to systems and methods for failure warning.

BACKGROUND

With the development of science and technology, many systems can implement various functions by coordinating a variety of devices to work in cooperation. For instance, a medical imaging system may include an imaging device, a user terminal device, a storage device, a processing device, etc. The imaging device may further include various components, such as a cooling device, a detector, a radiation source, etc. When a failure occurs to one or more devices in the medical imaging system, the normal operation of the whole system may be affected. In addition, the imaging device is usually expensive and the maintenance of the imaging device costs a lot of manpower and resources. Thus, it is desired to provide systems and methods for effective failure detection and failure warning.

SUMMARY

According to an aspect of the present disclosure, a method for failure warning is provided. The method may be implemented on an alarming server that is connected to a target device and a user terminal. The method may include obtaining, from the target device, log information including a first failure detection result and one or more first parameter values of one or more operation parameters of the target device. The first failure detection result may be generated by the target device and indicate whether the target device has a failure. The method may further include determining, based on the one or more first parameter values, a second failure detection result regarding the target device. The methods may further include sending, to the user terminal, a failure analysis report regarding the target device based on the first failure detection result and the second failure detection result.

In some embodiments, the determining, based on the one or more first parameter values, a second failure detection result regarding the target device may include determining the second failure detection result according to one or more preset rules associated with the one or more operation parameters.

In some embodiments, the method may further include determining whether there is a contradiction between the first failure detection result and the second failure detection result; and in response to determining that there is a contradiction between the first failure detection result and the second failure detection result, updating the one or more preset rules associated with the one or more operation parameters.

In some embodiments, the determining, based on the one or more first parameter values, a second failure detection result regarding the target device may include: obtaining reference log information of a plurality of reference devices that are of the same type as the target device, the reference log information of each of the plurality of reference devices including a reference failure detection result and one or more second parameter values of the one or more operation parameters of the reference device; selecting, from the plurality of reference devices, one or more reference devices based on the one or more first parameter value of the target device and the one or more second parameter values of each reference device; and determining the second failure detection result based on the one or more reference failure detection results of the one or more selected reference devices.

In some embodiments, the determining, based on the one or more first parameter values, a second failure detection result regarding the target device may include obtaining one or more third parameter values of one or more environment parameters of an application environment of the target device; and determining the second failure detection result based on the one or more first parameters values and the one or more third parameter values.

In some embodiments, the determining, based on the one or more first parameter values, a second failure detection result regarding the target device may include determining, using a failure detection model, the second failure detection result based on the one or more first parameter values.

In some embodiments, the failure detection model may be obtained using a federated learning algorithm.

In some embodiments, the failure detection model may be generated by the alarming server by performing an iterative process including a plurality of iterations, at least one iteration of the plurality of iterations comprising: obtaining, from a first processing device, one or more first model parameters of a first intermediate model, the first intermediate model corresponding to the target device; obtaining, from each of one or more second processing devices, one or more second model parameters of a second intermediate model, the second intermediate model corresponding to a reference device, and a type of the reference device being the same as a type of the target device; determining, whether a termination condition is satisfied; and in response to determining that the termination condition is not satisfied, determining, based on the one or more first model parameters and the one or more second model parameters, target model parameters for updating the first intermediate model and the second intermediate model to be used in a next iteration.

In some embodiments, the sending, to the user terminal, a failure analysis report regarding the target device based on the first failure detection result and the second failure detection result may include generating the failure analysis report based on a priority order of the first failure detection result and the second failure detection result, wherein a priority level of the first failure detection result is higher than the second failure detection result.

In some embodiments, the target device may be a medical imaging device.

In some embodiments, the method may further include obtaining a failure solving result from the target device. The failure solving result may be generated after one or more failure solutions for solving the failure are applied to the target device, and the one or more failure solutions may be determined by the target device or a user of the target device. The method may further include determining, based on the failure solving result, whether the failure has been successfully solved; in response to determining that the failure has not been successfully solved, determining one or more modified failure solutions for solving the failure; and sending the one or more modified failure solutions to at least one of the target device or the user terminal.

In some embodiments, the one or more failure solutions may be determined by the target device based on a predetermined solution set including a plurality of failure types and their corresponding recommended failure solutions. The method may further include determining, from the plurality of failure types, a target failure type corresponding to the failure of the target device; and updating, based on the failure solving result, the recommended failure solution of the target failure type in the predetermined solution set.

According to another aspect of the present disclosure, a system is provided. The system may include an alarming server, a target device, and a user terminal. The alarming server may be connected to the target device and the user terminal. The alarming server may be configured to: obtain, from the target device, log information including a first failure detection result and one or more first parameter values of one or more operation parameters of the target device, the first failure detection result being generated by the target device and indicating whether the target device has a failure; determine, based on the one or more first parameter values, a second failure detection result regarding the target device; and send, to the user terminal, a failure analysis report regarding the target device based on the first failure detection result and the second failure detection result.

According to yet another aspect of the present disclosure, a system for failure warning is provided. The system may include an obtaining module and an alarming module. The obtaining module may be configured to obtain, from a target device, log information including a first failure detection result and one or more first parameter values of one or more operation parameters of the target device, the first failure detection result being generated by the target device and indicating whether the target device has a failure. The alarming module may be configured to determine, based on the one or more first parameter values, a second failure detection result regarding the target device; and send, to a user terminal, a failure analysis report regarding the target device based on the first failure detection result and the second failure detection result.

According to still another aspect of the present disclosure, a non-transitory computer readable medium is provided. The non-transitory computer readable medium may include at least one set of instructions. When executed by at least one processor of a computing device, the at least one set of instructions may direct the at least one processor to perform operations including: obtaining, from a target device, log information including a first failure detection result and one or more first parameter values of one or more operation parameters of the target device, the first failure detection result being generated by the target device and indicating whether the target device has a failure; determining, based on the one or more first parameter values, a second failure detection result regarding the target device; and sending, to a user terminal, a failure analysis report regarding the target device based on the first failure detection result and the second failure detection result.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "engine," "unit," "module," and/or "block" used herein are one method to distinguish different components, elements, parts, sections, or assemblies of different levels in ascending order. However, the terms may be displaced by another expression if they achieve the same purpose.

Figure 2:
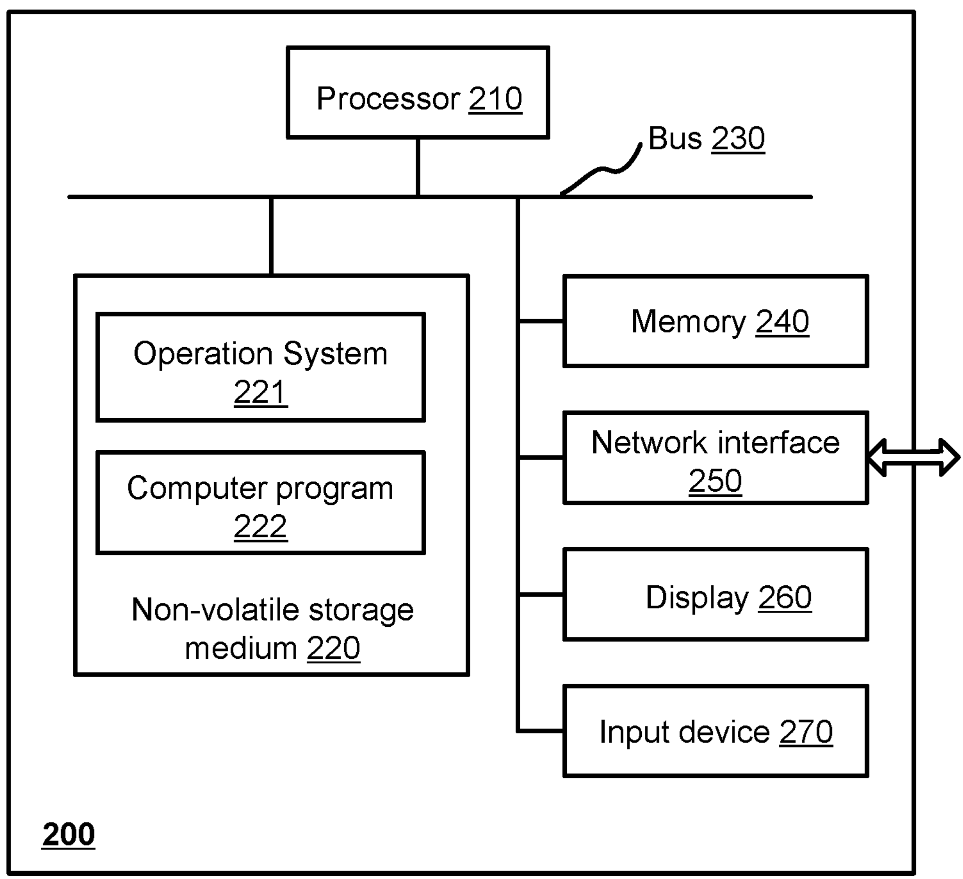
FIG. 2 is a schematic diagram illustrating an exemplary computing device according to some embodiments of the present disclosure.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 210 as illustrated in FIG. 2) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

An aspect of the present disclosure relates to systems and methods for failure warning. The systems may at least include a target device, an alarming server, and a user terminal. The alarming server may be connected to the target device and the user terminal. The target device may be configured to generate log information during operation. For example, the log information may include a first failure detection result and one or more first parameter values of one or more operation parameters of the target device. The target device may send the log information to the alarming server. The alarming server may determine a second failure detection result regarding the target device based on the one or more first parameter values. The second failure detection result may include a predicted result of whether a failure is likely to occur or has occurred to the target device(s). A failure analysis report regarding the target device may be generated by the alarming server based on the first failure detection result and the second failure detection result. In some embodiments, the failure analysis report may be sent to the user terminal.

In conventional methods for failure detection and failure warning, the target device is configured to detect whether a failure has occurred to itself or a portion thereof. When a failure is detected, the target device may notify a user by sending a warning or an alarm to the corresponding user terminal. Normally, the target device is only able to detect a failure that has already happened and affected the normal operation of the target device, and the repair of such failure costs a lot of time and resources. Compared with the conventional methods, the systems and methods provided by the present disclosure are more effective and more accurate. For instance, in addition to the first failure detection result generated by the target device, the alarming server also generates a second failure detection result based on one or more parameter values of one or more operation parameters of the target device. The alarming server may detect a failure that is not detected by the target device, such as a predicted failure that is likely to occur or a failure that has occurred but not affected the normal operation of the target device. Accordingly, maintenance may be performed on the target device to avoid the predicted failure or reduce the effect of the predicted failure on the normal operation of the target device. Thus, the systems and methods provided by the present disclosure may reduce the damage of the failure on the target device and the cost of repairing the target device.

Figure 1:
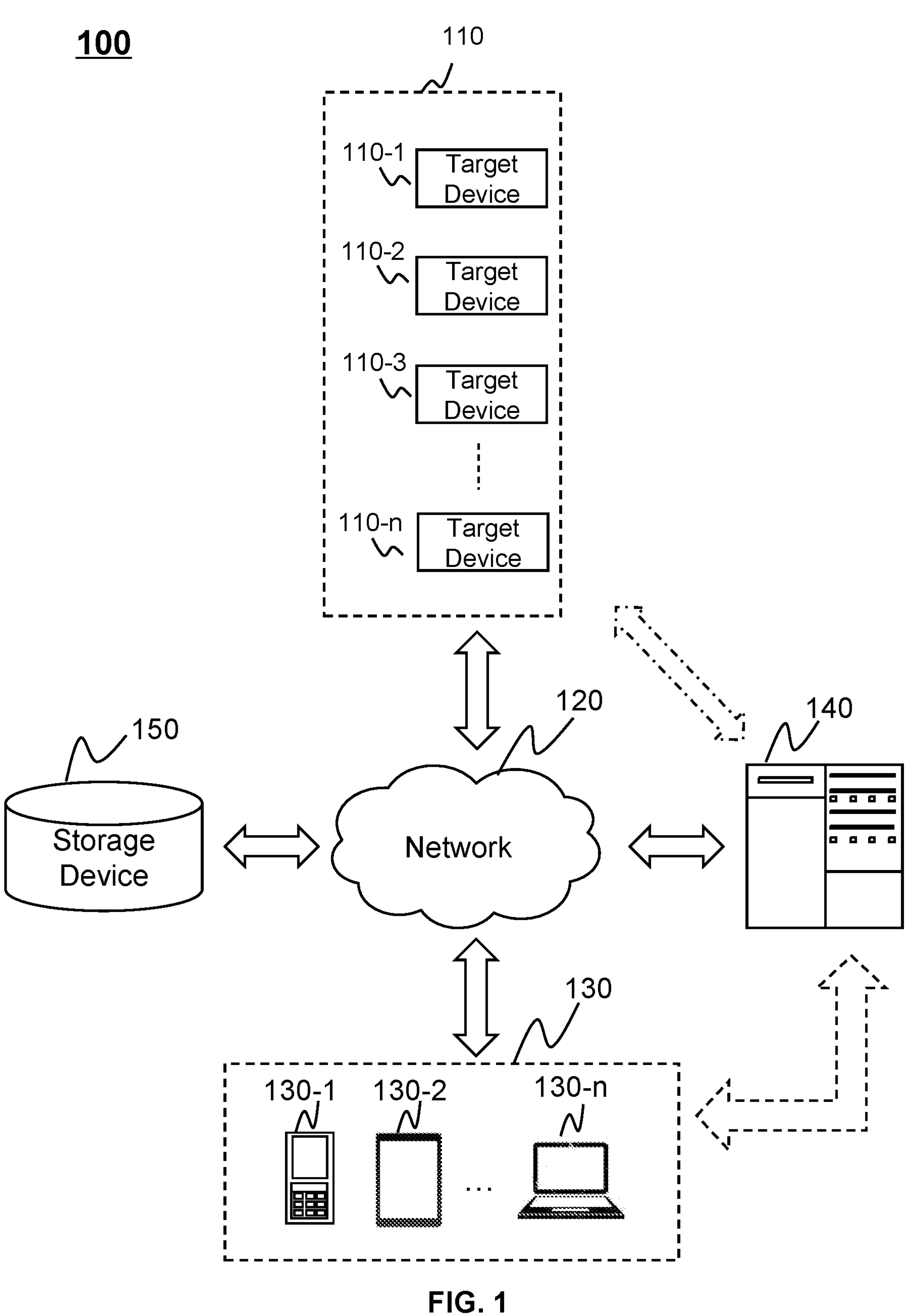
FIG. 1 is a schematic diagram illustrating an exemplary failure warning system according to some embodiments of the present disclosure.

FIG. 1 is a schematic diagram illustrating an exemplary failure warning system 100 according to some embodiments of the present disclosure. As shown in FIG. 1, the failure warning system 100 may include one or more target devices 110, a network 120, one or more user terminals 130, an alarming server 140, and a storage device 150. In some embodiments, the target device(s) 110, the user terminal(s) 130, the alarming server 140, and/or the storage device 150 may be connected to and/or communicate with each other via a wireless connection (e.g., the network 120), a wired connection, or a combination thereof. The connection between the components of the failure warning system 100 may be variable. Merely by way of example, the target device(s) 110 may be connected to the alarming server 140 through the network 120, as illustrated in FIG. 1. As another example, the target device(s) 110 may be connected to the alarming server 140 directly.

The target device(s) 110 may include one or more devices that need to be monitored. In some embodiments, the target device(s) may include a single target device or a plurality of target devices (e.g., a target device 110-1, a target device 110-2, a target device 110-3, . . . and, a target device 110-*n* as shown in FIG. 1). Different target devices may be of the same type or different types. Different target devices may be located in a same region or different regions. In some embodiments, a target device 110 may be configured to generate log information during operation. For example, the log information may include a first failure detection result and/or one or more first parameter values of one or more operation parameters of the target device. The first failure detection result may be generated by the target device 110 itself and indicate whether the target device 110 has a failure. The target device 110 may be further configured to send the log information to the alarming server 140.

In some embodiments, the target device(s) may include a medical device, such as a medical imaging device, a treatment device, etc. Merely by way of example, the target device(s) 110 may include a single-modality scanner and/or multi-modality scanner for collecting image data of a subject. The single-modality scanner may include, for example, an X-ray imaging device, an ultrasonic imaging device, a computed tomography (CT) scanner, a magnetic resonance imaging (MRI) scanner, a positron emission tomography (PET) scanner, etc. The multi-modality scanner may include a single photon emission computed tomography-computed tomography (SPECT-CT) scanner, a positron emission tomography-computed tomography (PET-CT) scanner, a computed tomography-ultra-sonic (CT-US) scanner, a digital subtraction angiography-computed tomography (DSA-CT) scanner, or the like, or a combination thereof. As another example, the medical device may include a treatment device, such as a treatment plan device (TPS), an image-guide radiotherapy (IGRT) device, etc. In some embodiments, the subject may include a body (e.g., a human body), a substance, an object, or the like, or a combination thereof.

The network 120 may include any suitable network that can facilitate the exchange of information and/or data for the failure warning system 100. In some embodiments, one or more components of the failure warning system 100 (e.g., the target device(s) 110, the alarming server 140, the storage device 150, the user terminal(s) 130) may communicate information and/or data with one or more other components of the failure warning system 100 via the network 120. For example, the alarming server 140 may obtain log information from a target device 110 via the network 120. As another example, the alarming server 140 may transmit a failure analysis report regarding the target device 110 to a user terminal 130 via the network 120. The network 120 may be or include a public network (e.g., the Internet), a private network (e.g., a local area network (LAN)), a wired network, a wireless network (e.g., an 802.11 network, a Wi-Fi network), a frame relay network, a virtual private network (VPN), a satellite network, a telephone network, routers, hubs, switches, server computers, and/or any combination thereof.

The user terminal(s) 130 may enable user interaction between a user and failure warning system 100. For example, the user terminal(s) 130 may display a failure analysis report obtained from the alarming server 140 to the user. As another example, the user terminal(s) 130 may receive a user instruction to monitor an operating state of a target device 110. In some embodiments, the user terminal (s) 130 may include a mobile device 130-1, a tablet computer 130-2, . . . , a laptop computer 130-*n*, or the like, or any combination thereof. In some embodiments, the user terminal(s) 130 may include an input device, an output device, etc. The input device may include alphanumeric and other keys that may be input via a keyboard, a touch screen (for example, with haptics or tactile feedback), a speech input, an eye tracking input, a brain monitoring system, or any other comparable input mechanism. The input information received through the input device may be transmitted to the alarming server 140 via, for example, a bus, for further processing. Other types of the input device may include a cursor control device, such as a mouse, a trackball, or cursor direction keys, etc. The output device may include a display, a speaker, a printer, or the like, or a combination thereof. In some embodiments, a user terminal 130 may be part of the alarming server 140 or a target device 110.

The alarming server 140 may process data and/or information obtained from the target device(s) 110, the storage device 150, the user terminal(s) 130, or other components of the failure warning system 100. For example, the alarming server 140 may obtain, from a target device 110, log information including a first failure detection result and one or more first parameter values of one or more operation parameters of the target device 110. The alarming server 140 may be directed to determine a second failure detection result regarding the target device 110 based on the one or more first parameter values. Further, the alarming server 140 may be directed to send a failure analysis report regarding the target device 110 based on the first failure detection result and the second failure detection result to a user terminal 130.

In some embodiments, the alarming server 140 may be a single server or a server group. The server group may be centralized or distributed. In some embodiments, the alarming server 140 may be local to or remote from the failure warning system 100. In some embodiments, the alarming server 140 may be implemented on a cloud platform. For example, the cloud platform may include a private cloud, a public cloud, a hybrid cloud, a community cloud, a distributed cloud, an inter-cloud, a multi-cloud, or the like, or a combination thereof. In some embodiments, the alarming server 140 may be implemented by a computing device 200 having one or more components as described in connection with FIG. 2.

The storage device 150 may store data, instructions, and/or any other information. In some embodiments, the storage device 150 may store data obtained from the alarming server 140, the user terminal(s) 130, and/or the storage device 150. In some embodiments, the storage device 150 may store data and/or instructions that the alarming server 140 may execute or use to perform exemplary methods described in the present disclosure. In some embodiments, the storage device 150 may include a mass storage device, a removable storage device, a volatile read-and-write memory, a read-only memory (ROM), or the like, or any combination thereof. In some embodiments, the storage device 150 may be implemented on a cloud platform as described elsewhere in the disclosure.

This description is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. However, those variations and modifications do not depart the scope of the present disclosure. For example, the failure warning system 100 may include one or more additional components and/or one or more components of the failure warning system 100 described above may be omitted. Additionally or alternatively, two or more components of the failure warning system 100 may be integrated into a single component. A component of the failure warning system 100 may be implemented on two or more sub-components.

FIG. 2 is a schematic diagram illustrating an exemplary computing device according to some embodiments of the present disclosure. Computing device 200 shown in FIG. 2 is provided for illustration purposes, and should not bring any limitation to the embodiments of the present disclosure. In some embodiments, the alarming server 140, a target device 110, and/or a user terminal 130 may be implemented on the computing device 200, respectively.

As shown in FIG. 2, computing device 200 may include a processor 210, a non-volatile storage medium 220, a bus 230, a memory 240, a network interface 250, a display 260, and an input device 270.

In some embodiments, the processor 210 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or a combinations thereof.

Merely for illustration, only one processor is described in the computing device 200. However, it should be noted that the computing device 200 in the present disclosure may also include multiple processors. Thus, operations and/or method steps that are performed by one processor as described in the present disclosure may also be jointly or separately performed by the multiple processors. For example, if in the present disclosure the processor of the computing device 200 executes both operation A and operation B, it should be understood that operation A and operation B may also be performed by two or more different processors jointly or separately in the computing device 200 (e.g., a first processor executes operation A and a second processor executes operation B, or the first and second processors jointly execute operations A and B).

The non-volatile storage medium 220 may include a mass storage device, a removable storage device, a volatile read-and-write memory, a read-only memory (ROM), or the like, or any combination thereof. In some embodiments, the non-volatile storage medium 220 may store one or more programs and/or instructions to perform exemplary methods described in the present disclosure. In some embodiments, the non-volatile storage medium 220 may further store an operation system 221 and a computer program 222. In some embodiments, the operation system 221 and the computer program 222 may be loaded into the memory 240 from the non-volatile storage medium 220 and executed by the processor 210, for example, to generate a second failure detection result based on the one or more first parameter values of the log information obtained from the target device(s) 110.

The bus 230 represents one or more of several types of bus structures, including a memory bus, a memory controller, a peripheral bus, a graphics acceleration port, a processor, or a local bus using any bus structure among multiple bus structures. For example, these architectures include but are not limited to industry standard architecture (ISA) bus, microchannel architecture (MAC) bus, enhanced ISA bus, Video Electronics Standards Association (VESA) local bus, and peripheral component interconnection (PCI) bus.

The network interface 250 may enable the computing device 200 to communicate with an external device, such as the target device(s) 110 and/or the storage device 150. The display 260 may be configured to present information to a user, such as a failure analysis report. Examples of the display 260 may include a liquid crystal display (LCD), a light-emitting diode (LED)-based display, a flat panel display, a curved screen, a television device, a cathode ray tube (CRT), a touch screen, or the like, or any combination thereof. The input device 270 may include but is not limited to a keyboard, a mouse, a touch screen, a microphone, or the like, or any combination thereof.

Figure 3:
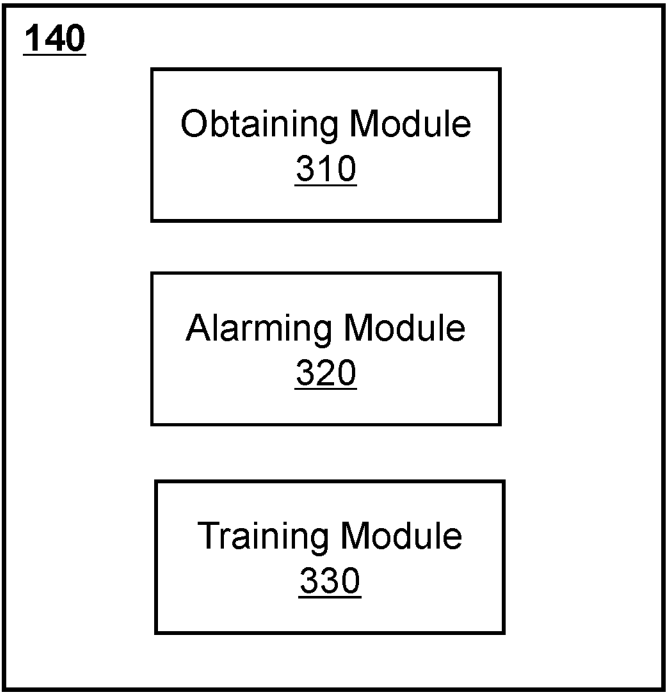
FIG. 3 is a block diagram illustrating an exemplary alarming server according to some embodiments of the present disclosure.
Figure 4:
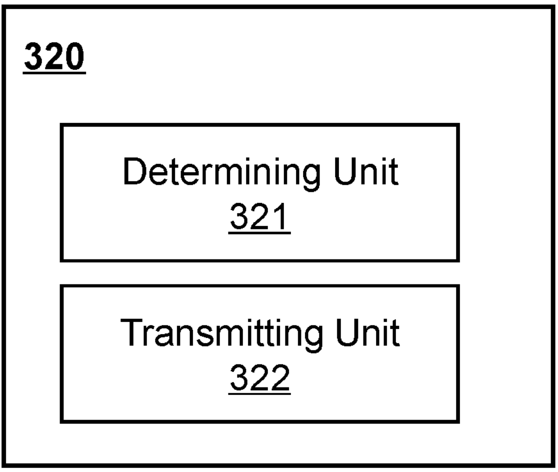
FIG. 4 is a block diagram illustrating an exemplary alarming module according to some embodiments of the present disclosure.

FIG. 3 is a block diagram illustrating an exemplary alarming server 140 according to some embodiments of the present disclosure. As illustrated in FIG. 3, the alarming server 140 may include an obtaining module 310, an alarming module 320, and a training module 330. FIG. 4 is a block diagram illustrating an exemplary alarming module 320 according to some embodiments of the present disclosure. As illustrated in FIG. 4, the alarming module 320 may include a determination unit 321 and a transmitting unit 322.

The obtaining module 310 may obtain data or information from one or more components of the system 100. In some embodiments, the obtaining module 310 may obtain log information from the target device 110. The log information may include a first failure detection result and one or more first parameter values of one or more operation parameters of the target device 110. In some embodiments, the obtaining module 310 may obtain reference log information of a plurality of reference devices that are of the same type as the target device. The reference log information of each of the plurality of reference devices may include a reference failure detection result and one or more second parameter values of the one or more operation parameters of the reference device. In some embodiments, the obtaining module 310 may obtain one or more third parameter values of one or more environment parameters of an application environment of the target device. In some embodiments, the obtaining module 310 may obtain, from a first processing device, one or more first model parameters of a first intermediate model. The first intermediate model may correspond to the target device. In some embodiments, the obtaining module 310 may obtain, from each of one or more second processing devices, one or more second model parameters of a second intermediate model. The second intermediate model may correspond to a reference device, and a type of the reference device may be the same as a type of the target device.

The alarming module 320 (e.g., the determining unit 321) may determine a second failure detection result regarding the target device based on the first parameter value(s). In some embodiments, the alarming module 320 (e.g., the determining unit 321) may determine whether the failure of the target device 110 has been successfully solved. In response to determining that the failure has not been successfully solved, the alarming module 320 (e.g., the determining unit 321) may determine one or more modified failure solutions for solving the failure, and send the one or more modified failure solutions to at least one of the target device or the user terminal. In some embodiments, the alarming module 320 (e.g., the determining unit 321) may determine, from the plurality of failure types, a target failure type corresponding to the failure of the target device 110. The alarming module 320 (e.g., the determining unit 321) may further update, based on the failure solving result, the recommended failure solution of the target failure type in the predetermined solution set. In some embodiments, the alarming module 320 (e.g., the transmitting unit 322) may send, to a user terminal, a failure analysis report regarding the target device 110 based on the first failure detection result and the second failure detection result. In some embodiments, the alarming module 320 (e.g., the transmitting unit 322) may send an alarm to the user terminal 130.

The training module 330 may generate a trained machine-learning model. In some embodiments, the training module 330 may generate a failure detection model for determining the second failure detection result, e.g., using a federated learning algorithm. In some embodiments, the training module 330 may generate the failure detection model by performing an iterative process including a plurality of iterations. At least one iteration of the plurality of iterations may include: obtaining, from a first processing device, one or more first model parameters of a first intermediate model, the first intermediate model corresponding to the target device; obtaining, from each of one or more second processing devices, one or more second model parameters of a second intermediate model, the second intermediate model corresponding to a reference device, and a type of the reference device being the same as a type of the target device; determining, whether a termination condition is satisfied; and in response to determining that the termination condition is not satisfied, determining, based on the one or more first model parameters and the one or more second model parameters, target model parameters for updating the first intermediate model and the second intermediate model to be used in a next iteration.

The modules and units may be hardware circuits of all or part of the alarming server 140. The modules and units may also be implemented as an application or set of instructions read and executed by the alarming server 140. Further, the modules and units may be any combination of the hardware circuits and the application/instructions. For example, the modules and units may be the part of the alarming server 140 when the alarming server 140 is executing the application/set of instructions.

It should be noted that the above description is merely provided for the purposes of illustration, and is not intended to limit the scope of the present disclosure. For persons having ordinary skills in the art, multiple variations or modifications may be made under the teachings of the present disclosure. However, those variations and modifications do not depart from the scope of the present disclosure. In some embodiments, any module mentioned above may be divided into two or more units. In some embodiments, the alarming server 140 may include one or more additional modules. For example, the alarming server 140 may further include a control module configured to generate control signals for one or more components in the failure warning system 100. In some embodiments, one or more modules of the alarming server 140 described above may be omitted. For example, the training module 330 may be omitted from the alarming server 140, and the functions of the training module 330 may be implemented by a training module of another computing device (e.g., a processing device of a vendor of a failure detection model).

Figure 5:
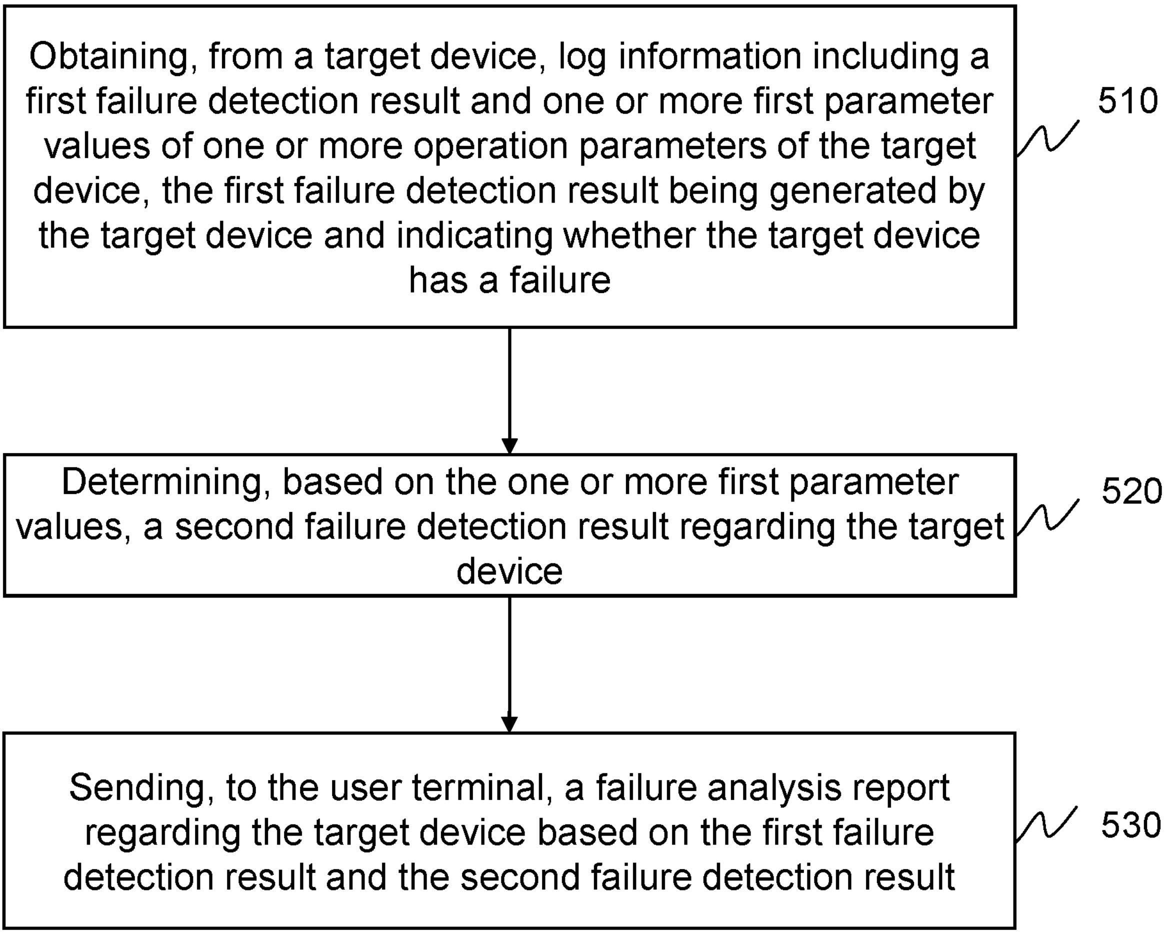
FIG. 5 is a flowchart illustrating an exemplary process for failure warning according to some embodiments of the present disclosure.

FIG. 5 is a flowchart illustrating an exemplary process for failure warning according to some embodiments of the present disclosure. In some embodiments, the process 500 may be implemented in the failure warning system 100 as illustrated in FIG. 1. For example, the process 500 may be stored in a storage device (e.g., the storage device 150, the non-volatile storage medium 220) as a form of instructions, and invoked and/or executed by the alarming server 140 (e.g., the processor 210 of the computing device 200, and/or one or more modules of the alarming device 140 shown in FIG. 3).

Merely for illustration, only one target device 110 is described in the process 500. It should be noted that, in some embodiments, there may be a plurality of target devices 110 that are communicatively connected with the alarming server 140. The alarming server 140 may perform the process 500 for each of the plurality of target devices 110.

In 510, the alarming server 140 may obtain, from a target device 110, log information including a first failure detection result and one or more first parameter values of one or more operation parameters of the target device 110. In some embodiments, operation 510 may be performed by the obtaining module 310 of the alarming device 140.

In some embodiments, the target device 110 may be any kind of device that needs to be monitored. For example, the target device 110 may be a medical device, such as a medical imaging device, a radiotherapy device, etc. Exemplary medical imaging devices may include but are not limited to an X-ray imaging device, an ultrasonic imaging device, a CT device, an MRI device, a PET device, a SPECT device, or the like, or any combination thereof. As another example, the target device 110 may be a surveillance camera, a traffic light, an electric transductor, etc. In some embodiments, the target device 110 may be a specific component of a device, such as a cooling head, a detector, a radiation source, etc., of a medical imaging device.

In some embodiments, when the target device 110 is in operation, the target device 110 may generate the log information. The log information may include information related to an operation process and/or an operation status of the target device 110. For example, the log information may include the first failure detection result and the first parameter value(s) of the operating parameter(s) of the target device 110. The log information may further include other information, such as an alarm level, a time point when the target device 110 starts working, a working duration, an instruction received from a user, etc. The operating parameter(s) may include, e.g., a temperature, a pressure, a voltage, a current, a moving speed, a moving direction, spare storage space, an amount of cooling agent, an operation duration, or the like, or any combination thereof. In some embodiments, at least a portion of the first parameter value (s) may be collected by one or more sensors mounted on or near the target device 110.

The first failure detection result may be generated by the target device 110 itself, which may indicate whether the target device 110 has a failure. As used herein, the term "failure" refers to a status that a device is not working properly as expected. For example, the first failure detection result may include an alarming indicator, the value of which may indicate whether the target device 110 has a failure. Merely by way of example, an alarming indicator having a value of 0 may indicate that the target device 110 has a failure, and an alarming indicator having a value of 1 may indicate that the target device 110 does not have a failure. Additionally or alternatively, if the target device 110 has a failure, the first failure detection result may include an alarming level indicating the severity of the failure. Merely by way of example, an alarming level of 3 may indicate a serious failure that affects the normal operation of the target device 110 (e.g., a compressor of the target device 110 breaks down), and an alarming level of 1 may indicate a minor failure that may not affect the normal operation of the target device 110 (e.g., a failure caused by user operation).

In some embodiments, the target device 110 may generate the first failure detection result based on whether its components work correctly or normally. For example, if the compressor of the target device 110 breaks down, the target device 110 may generate a first failure detection result indicating that the compressor has a failure. It should be noted that the target device 110 is only able to detect a failure that has already happened and/or a failure that has affected the normal operation of the target device 110. In other words, the first failure detection result may indicate that the target device 110 has a failure only after the failure actually occurs and/or the target device 110 (or a portion thereof) breaks down. As used herein, a failure that has already happened and/or affected the normal operation of the target device 110 is referred to as a first type of failure.

In some embodiments, the log information obtained from the target device 110 may include the first parameter value(s) of the operating parameter(s) at a predetermined time or during a predetermined time interval. The predetermined time interval may be determined according to a default setting or a user instruction. For example, the predetermined time interval may be 5 minutes (min), 10 min, 30 min, 1 hour (h), 3 h, or the like. In some embodiments, if the alarming server 140 fails to obtain the log information from the target device 110 over a preset period (e.g., 12 h, 24 h), the alarming server 140 may determine that a failure is likely to have occurred to the target device 110. The alarming server 140 may send an alarm to the user terminal 130.

In 520, the alarming server 140 may determine, based on the first parameter value(s), a second failure detection result regarding the target device. In some embodiments, operation 520 may be performed by the alarming module 320 (e.g., the determining unit 321) of the alarming device 140.

In some embodiments, the second failure detection result may include first failure detection information indicating whether a failure is likely to occur to the target device 110 which is currently operating in a normal state. As used herein, a failure that is likely to occur to the target device 110 operating in a normal state is referred to as a second type of failure. According to the first failure detection information, appropriate maintenance and/or repair may be accomplished before the second type of failure occurs. Thus, the target device 110 may keep working in the normal state. The damage to the target device 110 and/or one or more components of the target device 110 may be avoided or reduced through the appropriate maintenance. In some embodiments, the second failure detection result may include second failure detection information indicating whether a failure has occurred to the target device 110. On some occasions, a failure may have occurred to the target device 110, but the target device 110 may still currently work in a normal state. As used herein, a failure that has occurred to the target device 110 but has not affected the normal operation of the target device 110 is referred to as a third type of failure. After a certain period of time, the normal operation of the target device 110 may be affected by the third type of failure. The target device 110 may fail to detect this kind of failure, but the alarming server 140 may be able to detect this kind of failure by analyzing the first parameter value(s) of the operating parameter(s). Therefore, the second failure detection result generated by the alarming server 140, combined with the first failure detection result generated by the target device 110, may increase the accuracy of failure detection for the target device 110.

In some embodiments, the alarming server 140 may determine the second failure detection result using a failure detection model (e.g., a trained machine-learning model) based on the first parameter value(s) of the operating parameter(s). For example, the first parameter value(s) may be inputted into the failure detection model, and the failure detection model may output the second failure detection result. Optionally, the input of the failure detection model may further include parameter values of one or more device parameters, one or more environmental parameters, or the like, or any combination thereof, of the target device 110. The one or more device parameters may include, for example, a type, a model, a serial number, a material number (e.g., of a material used by the target device 110), a warranty period for the whole target device, a warranty period for components of the target device, a service life of the whole target device 110, a service life of the components of the target device, or the like, or any combination thereof. The one or more environmental parameters may include an environmental temperature, an environmental pressure, a position, a humidity, a sunlight intensity, a weather, an altitude, a geomorphological parameter, or other parameters related to an application environment of the target device, or any combination thereof. In some embodiments, in response to the model input, the failure detection model may output a probability (e.g., between 0-1) that a failure will occur or has occurred to the target device, or a determination result that indicates whether a failure will occur or has occurred to the target device. In some embodiments, the failure detection model may be used to determine the first failure detection information relating to the second type of failure (i.e., a failure that is likely to occur at a future time).

In some embodiments, the failure detection model may include a deep learning model, such as a convolutional neural network (CNN), a long short term memory network (LSTM), a recurrent neural network (RNN), a generative adversarial network (GAN), a radial basis function network (RBFN), a multilayer perceptron (MLP), a self-organizing map (SOM), or the like. In some embodiments, the failure detection model may include a trained Digital Twins model, such as a combination of a gradient boost decision tree and a logistic regression model. The digital twins model may involve a real-time virtual representation of a real-world physical system or process (a physical twin) that serves as the indistinguishable digital counterpart of the real-world physical system or process for practical purposes, such as system simulation, integration, testing, monitoring, and maintenance.

In some embodiments, the failure detection model may be trained by the alarming server 140 or another computing device (e.g., a processing device of a vendor of the failure detection model). For example, to generate the failure detection model, the alarming device 140 may use a plurality of training datasets to train a preliminary model. For instance, each of the plurality of training datasets may include sample parameter value(s) of the operation parameter(s), the device parameter(s), the environmental parameter(s) of a sample device, and a training label indicating whether the sample device has a failure. In some embodiments, the sample device may be the target device 110. A sample parameter value in a training dataset may be a historical parameter value of the target device 110. In some embodiments, the sample device may be a reference device that is of the same type or same model as the target device. In some embodiments, the failure detection model may be generated using a federated learning algorithm. More details regarding the generation of the failure detection model may be found elsewhere in the present disclosure, for example, in FIG. 10, and the descriptions thereof. In some embodiments, the failure detection model may be previously trained and stored in a storage device. The alarming server 140 may obtain the failure detection model from the storage device.

In some embodiments, the alarming device 140 may determine the second failure detection result according to one or more preset rules associated with the operating parameter(s). In response to determining that at least one first parameter value of at least one operation parameter in the log information fails to comply with the corresponding preset rule(s), the alarming device 140 may determine that a failure is likely to occur or has occurred to the target device 110.

In some embodiments, a preset rule associated with an operating parameter may include, for example, the first parameter value of the operating parameter is smaller or greater than a threshold value, the first parameter value is within a normal value range, the change rate of the first parameter value over a specific time is smaller than a change rate threshold, or the like, or any combination thereof. Merely by way of example, the target device 110 may include a cooling device configured to decrease the temperature of a motor of the target device 110. A preset rule may specify that the temperature of the motor is lower than a threshold temperature, and/or the pressure of the cooling water in the cooling device is within a normal pressure range. As another example, a preset rule may specify that the change in the pressure of the cooling water within 3 days is less than or equal to 2% of the present pressure of the cooling water, or the pressure of the cooling water cannot decrease in two consecutive days. In some embodiments, the preset rule may be used to determine the second failure detection information relating to the third type of failure (i.e., a failure that has occurred but has not affected the normal operation of the target device 110).

In some embodiments, the alarming server 140 may determine whether there is a contradiction between the first failure detection result and the second failure detection result after the second failure detection result is determined based on the preset rule(s). In response to determining that there is a contradiction between the first failure detection result and the second failure detection result, the alarming server 140 may update the preset rule(s). Merely by way of example, the second failure detection result may include a second failure detection result relating to a component of the target device 110, which is generated by analyzing the operating parameter(s) of the component according to one or more preset rules relating to the operating parameter(s). If the first failure detection result indicates that a failure has occurred to the component of the target device 110, while the second failure detection result relating to the component indicates that no failure is likely to occur or has occurred to the component, the alarming server 140 may determine that there is a contradiction between the first failure detection result and the second failure detection result. Further, the alarming server 140 may update the preset rule(s) relating to the operating parameter(s) of the component such that a second failure detection result generated based on the updated preset rule(s) is consistent with the first failure detection result. In this way, the preset rule(s) may be improved constantly based on actual failure detection results and have improved accuracy.

In some embodiments, the alarming server 140 may determine the second failure detection result (e.g., the first failure detection information and/or the second failure detection information) based on reference log information of a plurality of reference devices. The plurality of reference devices may be of the same type and/or the same model as the target device 110. In some embodiments, the reference devices may be located in the same environment as or a similar environment to the target device 110. The reference log information of each reference device may include a reference failure detection result and one or more second parameter values of the operating parameter(s) of the reference device. In some embodiments, the reference log information may include real-time log information and/or historical log information obtained from the reference devices or the storage device 150. In some embodiments, the reference failure detection result of a reference device may include a result generated by the reference device, and indicate a failure has occurred to the reference device.

Further, the alarming server 140 may compare the first parameter value(s) to the more second parameter value(s). One or more reference devices may be selected from the plurality of reference devices based on a comparison result of the first parameter value(s) and the second parameter value(s). The operation status of the one or more selected reference devices may be similar to the operation status of the target device 110. For example, the comparison result may include a difference between the first parameter value and the second parameter value of each operating parameter, and a total difference may be determined by summing up the difference of each operating parameter. The selected reference device(s) may include a reference device having the smallest total difference. The alarming server 140 may then determine the second failure detection result based on the one or more reference failure detection results of the one or more selected reference devices. For example, if the reference failure detection result(s) indicate that most selected reference device(s) have a failure, the alarming server 140 may determine that the target device 110 is likely to have a failure.

In some embodiments, the alarming server 140 may determine the second failure detection result (e.g., the first failure detection information and/or the second failure detection information) based on a plurality of historical log information sets of the target device 110. Each historical log information set may include one or more historical parameter values of the operating parameter(s) and a corresponding historical failure detection result. The historical failure detection result may be generated by the target device 110 at a historical time, and indicate a failure had occurred to the target device. The alarming server 140 may select one or more historical log information sets from the plurality of historical log information sets based on a comparison result between the first parameter value(s) and the historical parameter value(s). The alarming server 140 may further determine the second failure detection result based on the historical failure detection result(s) of the selected historical log information set(s). The determination of the second failure detection result based on the historical log information sets may be performed in a similar manner as that based on the reference log information of the reference devices, and the descriptions thereof are not repeated here.

Since the reference failure detection results and the historical failure detection results are determined by the reference devices and the target device 110 in practical use, the second failure detection result determined based thereon may be more in line with reality and have improved accuracy.

In some embodiments, the alarming server 140 may obtain one or more third parameter values of the environment parameter(s) of an application environment of the target device 110, and determine the second failure detection result based on the first parameter value(s) and the third parameter value(s). For example, the first parameter value(s) and the third parameter value(s) may be input into the failure detection model together to determine the second failure detection result. As another example, a plurality of candidate failure detection models corresponding to different environment types may be obtained. The alarming server 140 may determine a target environment type of the application environment of the target device 110, and select a candidate failure detection model corresponding to the target environment type as the final failure detection model for determining the second failure detection result. Similarly, a plurality of candidate preset rules corresponding to different environment types may be obtained, and a candidate preset rule corresponding to the target environment type may be selected as the final preset rule for determining the second failure detection result. By determining the second failure detection result based on the environment data, the effect of the application environment of the target device 110 may be considered and the determined second failure detection result may have improved accuracy.

In 530, the alarming server 140 may send, to a user terminal, a failure analysis report regarding the target device 110 based on the first failure detection result and the second failure detection result. In some embodiments, operation 530 may be performed by the alarming module 320 (e.g., the transmitting unit 322) of the alarming device 140.

In some embodiments, the failure analysis report may be presented on a user terminal 130 to notify a user of details of the failure detection result regarding the target device 110. For instance, the failure analysis report may be presented by the user terminal 130 in various forms, such as text, a table, a graphical form, an audio form, a video, or the like, or any combination thereof. In some embodiments, there may be a plurality of user terminals 130 in the failure warning system 100. The alarming server 140 may identify one or more user terminals 130 associated with the target device 110 based on, for example, identification information of the user terminal 130. The alarming server 140 may further send the failure analysis report to the identified user terminal(s) 130.

In some embodiments, the failure analysis report may be generated based on a priority order of the first failure detection result and the second failure detection result. A failure detection result having a higher priority order may have greater importance and the failure in the failure detection result needs to be processed more urgently. For example, the priority level of the first failure detection result relating to the first type of failure (i.e., a failure that has already happened and/or affected the normal operation) may be higher than the second failure detection result. As another example, the priority level of the second failure detection information relating to the third type of failure (i.e., a failure that has occurred but not affected the normal operation) may be higher than that of the first failure detection information relating to the second type of failure (i.e., a failure that is likely to occur at future).

In some embodiments, the first failure detection result and the second failure detection result may be displayed in different forms in the failure analysis report based on the priority order. For example, the first failure detection result may be displayed before the second failure detection result, and the second failure detection information may be displayed before the first failure detection information. In some embodiments, the failure analysis report may include a label indicating the source or the type of a failure detection result, such that the user may quickly understand the type of a failure in the failure detection result.

In some embodiments, the content in the failure analysis report may be transmitted to the user terminal in batches based on the priority order. For example, it is assumed that the first failure detection result relating to the first type of failure has the highest priority level, the second failure detection information relating to the third type of failure has the second priority level, and the first failure detection information relating to the second type of failure has the lowest priority level. If the alarming server 140 firstly determines the first failure detection information at a first time point, the alarming server 140 may send the first failure detection information to the user terminal 130; if the alarming server 140 determines the second failure detection information at a second time point after the first time point, the alarming server 140 may send the second failure detection information to the user terminal 130; then, if the alarming server 140 obtains the first failure detection result from the target device 110 at a third time point after the second time point, the alarming server 140 may send the first failure detection result to the user terminal 130. As another example, if the alarming server 140 firstly obtains the first failure detection result from the target device 110 at the first time point, the alarming server 140 may send the first failure detection result to the user terminal 130; if the alarming server 140 determines the first failure detection information and/or the second failure detection information at the second time point, the alarming server 140 may not send the first failure detection information and/or the second failure detection information to the user terminal 130 if the interval between the first time point and the second time point is shorter than a preset period (e.g., 12 h). Optionally, the second failure detection information and/or the second failure detection information to the user terminal 130 12 hours after the first time point.

In some embodiments, the alarming server 140 may determine an alarm level of a failure in the first failure detection result and/or the second failure detection result. The alarm level may be determined based on, for example, a type, an emergency degree of the failure, and/or other factors. In some embodiments, the alarm level of a failure having the first type may be included in the log information of the target device 110. In some embodiments, an alarm regarding the failure may be sent to the user terminal 110, and the form of the alarm may be determined based on the alarm level of the failure. More descriptions regarding the alarm level may be found elsewhere in the present disclosure. See, e.g., FIG. 7 and relevant descriptions thereof.

In some embodiments, the target device 110 may determine one or more recommended failure solutions based on the type of a failure of the target device 110. The alarming server 140 may determine a failure solving result after at least one of the one or more recommended failure solutions is applied to the target device 110. In response to determining that the failure has not been successfully solved, the alarming server 140 may determine one or more modified failure solutions for solving the failure and send the one or more modified failure solutions to the target device 110 and/or the user terminal 130. More details regarding the determination of the failure solutions may be found elsewhere in the present disclosure, for example, in FIGS. 8-9 and the descriptions thereof.

In some embodiments, the user terminal may display a digital twin model of the target device (e.g., as a 3D model of the target device). When either the first failure detection result or the second failure detection result indicates existing or imminent failure in the target device, the digital twin model may be displayed in a specific manner to alert a user. Merely by way of example, the digital twin model may be displayed in red. As another example, if there is a faulty component within the target device, only a portion of the digital twin model that corresponds to the faulty component can be highlighted in red.

In some embodiments, the digital twin model can be utilized to display a predicted result of an anticipated failure in the target device. For example, a dynamic digital twin model showing the state of the target device over a future period may be displayed via the user terminal, enabling users to gain insights into the forthcoming condition of the target device. Optionally, this dynamic digital twin model may incorporate a time bar feature, allowing users to select and monitor the predicted state of the target device at any desired point in time.

Figure 6:
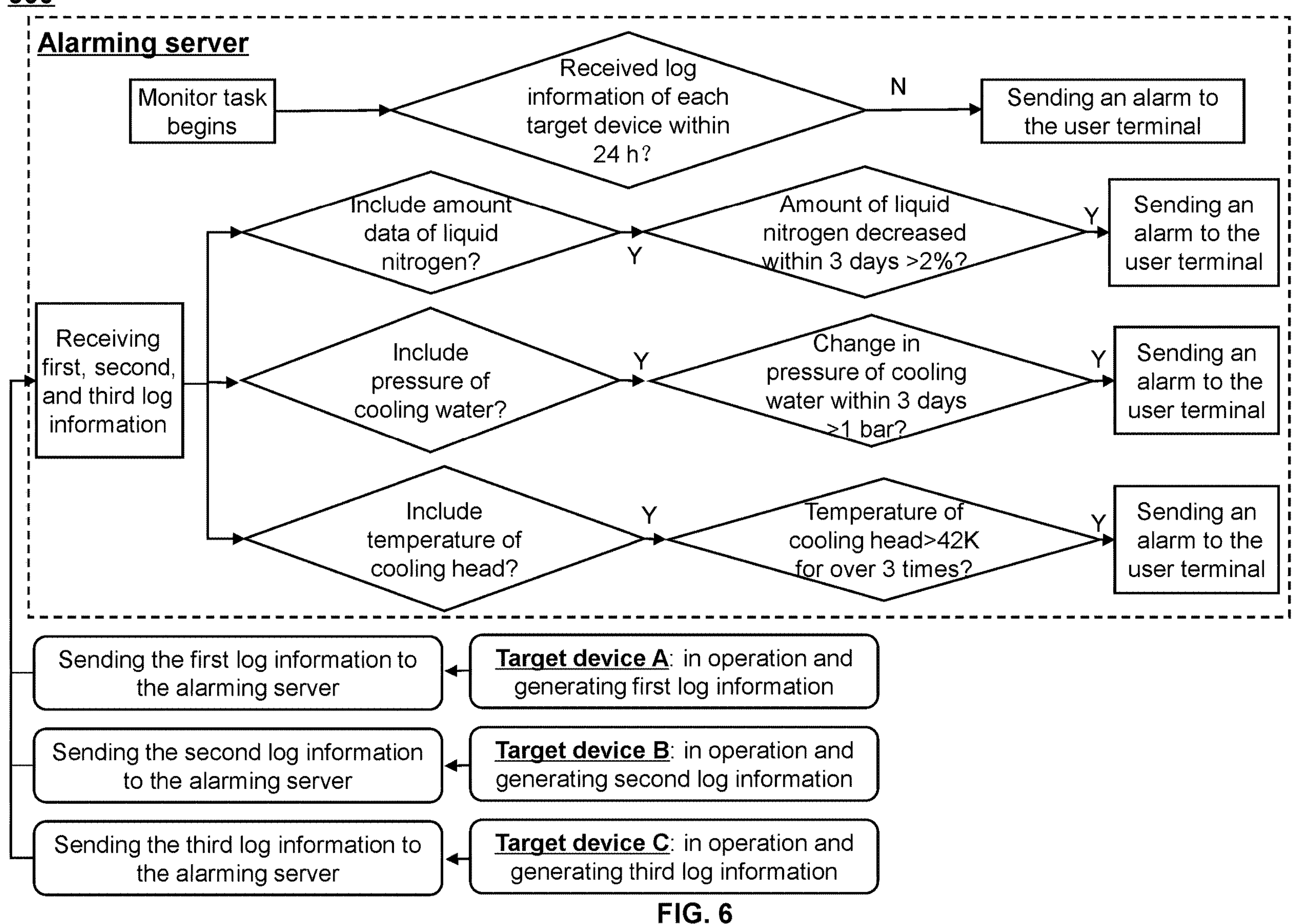
FIG. 6 is a schematic diagram illustrating an exemplary process for failure warning according to some embodiments of the present disclosure.

FIG. 6 is a schematic diagram illustrating an exemplary process 600 for failure warning according to some embodiments of the present disclosure. As illustrated in FIG. 6, a target device A, a target device B, and a target device C may generate first log information, second log information, and third log information, respectively, when they are in operation. The first, second, and third log information may be sent to an alarming server (e.g., the alarming server 140 illustrated in FIG. 1) continuously or intermittently (e.g., periodically). The alarming server may perform multiple operations to analyze the received log information and determine whether to send an alarm to a user terminal (e.g., the user terminal 130).

The alarming server may start a monitor task regarding the log information of the target devices A, B, and C. The alarming server may keep monitoring the receipt of the log information from each target device, and determine whether the log information of each target device is received within a preset period (e.g., 24 h). In response to determining that log information of a specific target device is not received within 24 h, the alarming server may send an alarm (or a warning) to the user terminal. For example, when target device A is not in operation, the first log information of target device A would not be generated or sent to the alarming server. As another example, when a failure occurs to the communication interface of the target device A or a network (e.g., the network 120) through which the target device A is connected with the alarming server, the first log information would not be successfully sent to the alarming server.

After receiving the first, second, and third log information, the alarming server may determine a second failure detection result of the target devices A, B, and C, respectively. For illustration purposes, the second failure detection result may be determined based on one or more preset rules related to the operating parameter(s) of each target device. In some embodiments, the target devices A, B, and C may be different types of devices. Different preset rules may be used for determining the second failure detection results of the target devices A, B, and C.

In some embodiments, the target devices A, B, and C may be the same type of devices. One or more same preset rules may be used for determining the second failure detection results for target devices A, B, and C. Taking the target device A for instance, the alarming server may determine that the first log information of the target device A includes an amount of liquid nitrogen and obtain a first preset rule related to the amount of liquid nitrogen. The first preset rule may specify that if the amount of liquid nitrogen decreased within 3 days needs to be equal to or smaller than 2%. If the amount of liquid nitrogen of the target device A decreased within 3 days is greater than 2%, the alarming server may determine that a failure regarding the amount of liquid nitrogen has occurred or is likely to occur, and send an alarm to the user terminal. As another example, the alarming server may determine that the first log information of the target device A includes a value of the pressure of cooling water and obtain a second preset rule related to the pressure of cooling water. The second preset rule may specify that the change in the pressure of the cooling water within 3 days needs to be equal to or smaller than 1 bar. If the change in the pressure of the cooling water of the target device A within 3 days is greater than 1 bar, the alarming server may determine that a failure regarding the pressure of the cooling water has occurred or is likely to occur and send an alarm to the user terminal. As yet another example, the alarming server may determine that the first log information of the target device A includes a value of the temperature of a cooling head and obtain a third preset rule related to the temperature of the cooling head. The third preset rule may specify that the number of times that the temperature of the cooling head exceeds 42K needs to be equal to or smaller than three times. If the number of times that the temperature of the cooling head of the target device A exceeds 42K is greater than 3, the alarming server may determine that a failure regarding the temperature of the cooling head has occurred or s likely to occur and may send an alarm to the user terminal.

As illustrated in FIG. 6, when one or more of the first preset rule, the second preset rule, and the third preset rule are not satisfied, the alarming server may determine that a failure has occurred or is likely to occur to the target device A or a component thereof while the target device A is still in a normal operation. In some embodiments, the failure may be solved before the operation of target device A becomes abnormal, which facilitates the target device A to keep working normally and reduces the damage caused to the target device A and/or components thereof.

Figure 7:
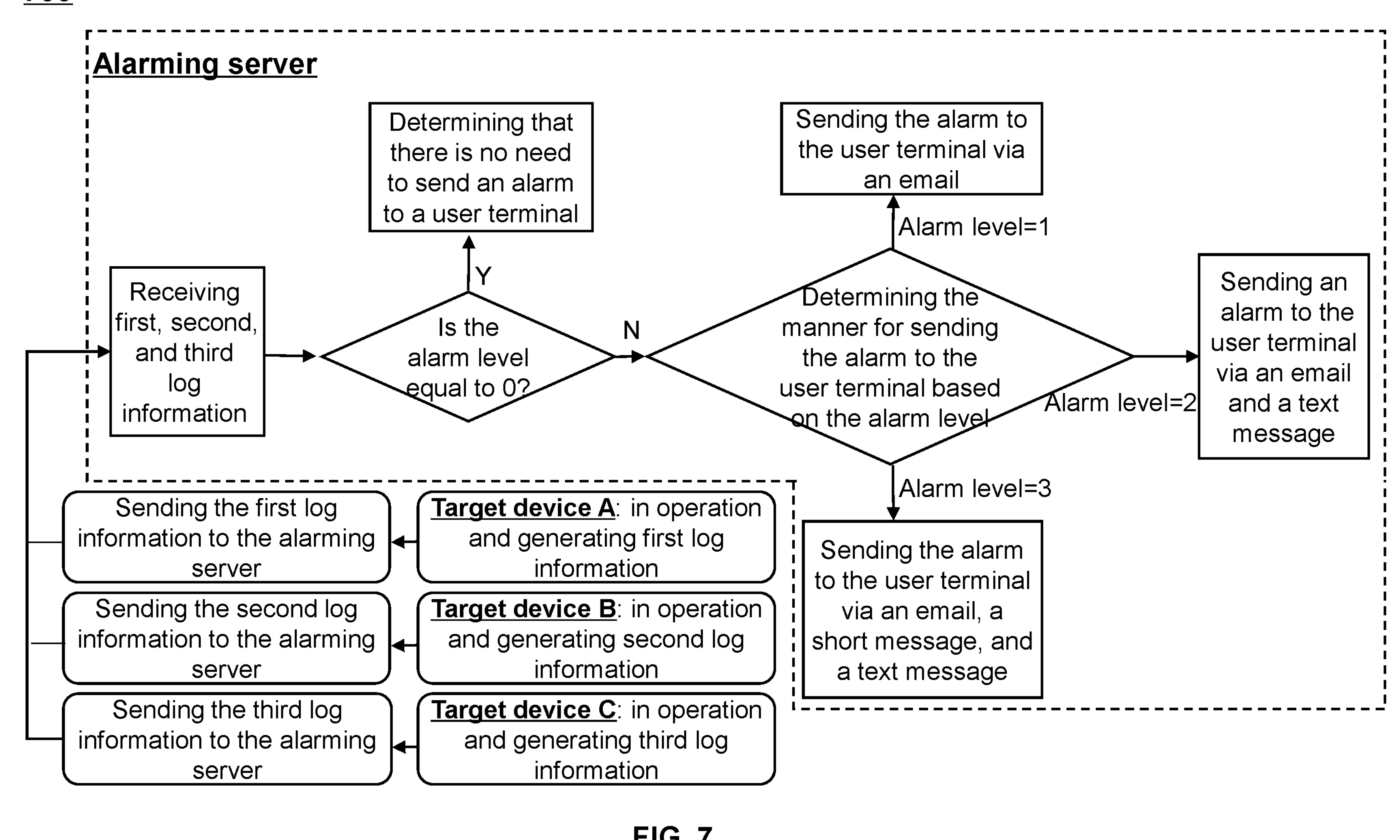
FIG. 7 is a schematic diagram illustrating an exemplary process for determining a means for sending an alarm to a user terminal according to some embodiments of the present disclosure.

FIG. 7 is a schematic diagram illustrating an exemplary process 700 for determining a means for sending an alarm to a user terminal according to some embodiments of the present disclosure. As illustrated in FIG. 7, the target devices A, B, and C may generate the first, second, and third log information, respectively, when they are in operation. The alarming server may perform multiple operations based on the log information.

Taking the target device A for instance, the first log information may include an alarm level related to a failure detected by the target device A. The alarm level may be determined based on a failure type, an emergency degree, or other factors. As another example, the alarm level related to the failure detected by the target device A may be determined by the alarming server. As yet another example, the alarm level related to the failure detected by the target device A may be determined by the target device A and examined and/or adjusted by the alarming server.

In some embodiments, in response to determining that the alarm level is equal to 0, the alarming server may determine that there is no need to send an alarm to the user terminal associated with the target device A. In response to determining that the alarm level is not equal to 0, the alarming server may determine that there is a need to send the alarm to the user terminal. As illustrated in FIG. 7, the alarming server may further determine a means for sending the alarm to the user terminal based on the alarm level.

In some embodiments, a relatively low alarm level (e.g., equal to 1) may correspond to a failure that is not urgent or does not need to be handled in a relatively short time (e.g., 12 h). The alarming server may send the alarm to the user terminal, for example, via an email. In some embodiments, the alarm may be presented to the user in various forms, such as a text, a graphical sign, an audio message, a video message, or the like, or any combination thereof. A medium alarm level (e.g., equal to 2) may correspond to a failure that is relatively important or needs to be handled in a relatively short time. The alarming server may send the alarm to the user terminal, for example, via an email and/or a text message transmitted through a communication App installed on the user terminal (e.g., WeChat, Enterprise WeChat, WhatsApp, iMessage, Line, Facebook, Instagram, etc.). A relatively high alarm level (e.g., equal to 3) may correspond to a failure that is highly important or needs to be handled immediately. The alarming server may send the alarm to the user terminal via multiple means so that the alarm may instantly reach the user. For instance, the alarming server may send the alarm to the user terminal via an email, a short message, and a text message transmitted through the communication App.

Figure 8:
FIG. 8 is a flowchart illustrating an exemplary process for determining one or more failure solutions according to some embodiments of the present disclosure.
Figure 8:
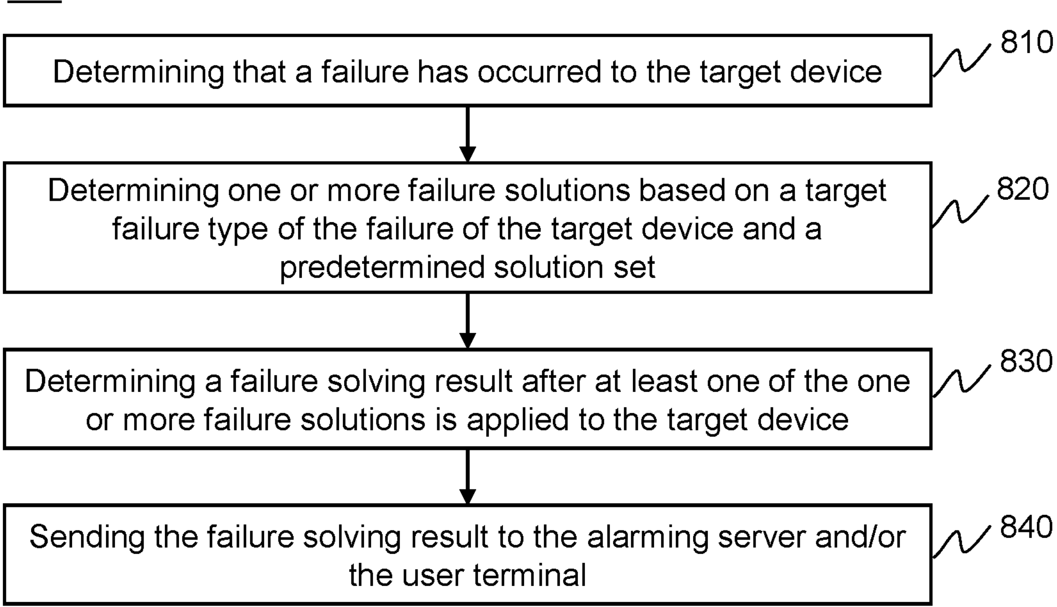

FIG. 8 is a flowchart illustrating an exemplary process for determining one or more failure solutions according to some embodiments of the present disclosure. In some embodiments, the process 800 may be implemented in the failure warning system 100 as illustrated in FIG. 1. For example, the process 800 may be stored in a storage device (e.g., the storage device 150, the non-volatile storage medium 220) as a form of instructions, and invoked and/or executed by the target device 110.

In 810, the target device 110 (e.g., a determination module of the target device 110) may determine that a failure has occurred to the target device 110.

In 820, the target device 110 (e.g., the determination module of the target device 110) may determine one or more failure solutions based on a target failure type of the failure of the target device 110 and a predetermined solution set.

The target failure type may include, for example, a motor of the target device 110 breaks down, a communication interface of the target device 110 cannot connect to a network, an over temperature of the target device 110, or the like, or any combination thereof. In some embodiments, the target failure type may be determined based on the type of the target device 110, the type of a component of the target device 110 that is not working properly, at least one operation parameter related to the failure, value(s) of the at least one operation parameter related to the failure, or the like, or any combination thereof. For instance, when the temperature of an X-ray tube of a CT scanner (i.e., the target device 110) is higher than a threshold value, the corresponding target failure type may be a failure that occurs to a cooling system of the X-ray tube. In some embodiments, the target device 110 may determine the target failure type from a plurality of failure types. In some embodiments, the target device 110 may obtain the target failure type of the failure of the target device 110 from the alarming server 140.

In some embodiments, the predetermined solution set may be generated in advance, for example, by the alarming server 140. The predetermined solution set may include a plurality of failure types and at least one recommended failure solution corresponding to each of the plurality of failure types. The target device 110 may determine one or more failure solutions corresponding to the target failure type based on the predetermined solution set. In some embodiments, if the target device 110 determines that the failure of the target device 110 does not belong to any failure types in the predetermined solution set. The target device 110 may obtain one or more failure solutions from the alarming server 140 and/or the user terminal 130.

A failure solution may include information such as a means for solving the failure, one or more actions that need to be performed for solving the failure, a time point before which the failure needs to be solved, a time duration needed for solving the failure, or the like, or any combination thereof. For example, the means for solving the failure may include solving the failure by the target device 110, solving the failure by a local user of the target device 110 (e.g., a user in proximity to the target device 110), solving the failure by the alarming server 140, solving the failure by a maintenance technician who is not in proximity to the target device 110, etc. Merely by way of example, the target failure type may be a failure that occurs to a cooling system of the X-ray tube, a corresponding solution may be to increase the flow rate of the cooling water in the cooling system. This solution may be automatically applied by the target device 110 (e.g., through a controller of the cooling system). Alternatively, this solution may be manually applied to the target device 110 by a local user of the target device 110.

In 830, the target device 110 (e.g., the determination module of the target device 110) may determine a failure solving result after at least one of the one or more failure solutions is applied to the target device.

The failure solving result may indicate whether the failure has been solved. For example, the target device 110 may determine whether the failure has been solved based on the parameter value(s) of at least one operation parameter related to the failure. In some embodiments, the target device 110 may determine a failure solving result after each failure solution is applied to the target device 110.

In 840, the target device 110 (e.g., a transmission module of the target device 110) may send the failure solving result to the alarming server 140 and/or the user terminal 130.

In some embodiments, if the failure solving result indicates that the failure has not been solved, the alarming server 140 may determine one or more modified solutions and send the one or more modified solutions to the target device 110 and/or the user terminal 130. More details regarding the generation of the one or more modified solutions may be found elsewhere in the present disclosure, e.g., in the description in connection with process 900.

It should be noted that the above description regarding the process 900 is merely provided for the purposes of illustration, and is not intended to limit the scope of the present disclosure. For persons having ordinary skills in the art, multiple variations or modifications may be made under the teachings of the present disclosure. However, those variations and modifications do not depart from the scope of the present disclosure. For instance, the failure solving result may be determined by the alarming server 140. Merely by way of example, updated log information may be transmitted from the target device 110 to the alarming server 140 after at least one of the one or more recommended solutions is applied to the target device 110. The alarming server 140 may determine the failure solving result based on parameter value corresponding to the at least one operation parameter related to the failure included in the updated log information.

Figure 9:
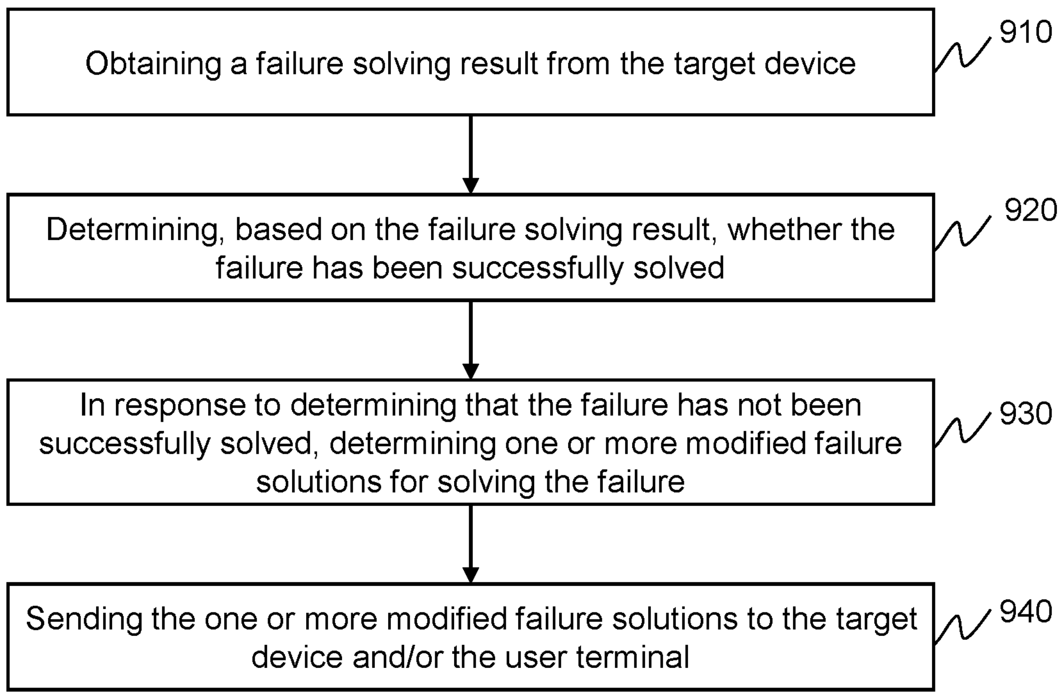
FIG. 9 is a flowchart illustrating an exemplary process for solving a failure of a target device according to some embodiments of the present disclosure.

FIG. 9 is a flowchart illustrating an exemplary process for solving a failure of a target device 110 according to some embodiments of the present disclosure. Merely for illustration, only one target device 110 is described in the process 900. It should be noted that there may be a plurality of target devices 110 that are communicatively connected with the alarming server 140. The alarming server 140 may perform the process 900 for each of the plurality of target devices 110.

In 910, the alarming server 140 may obtain a failure solving result from the target device 110. The failure solving result may be generated after one or more failure solutions for solving the failure are applied to the target device 110. The one or more failure solutions may be determined by the target device 110 or a user of the target device 110.

In 920, the alarming server 140 may determine, based on the failure solving result, whether the failure has been successfully solved.

In 930, in response to determining that the failure has not been successfully solved, the alarming server 140 may determine one or more modified failure solutions for solving the failure.

In some embodiments, the alarming server 140 may determine the one or more modified failure solutions based on one or more instructions of a maintenance technician, such as a maintenance technician who is not in proximity to the target device 110. For instance, an original failure solution applied to the target device 110 may include modifying the setting of the target device 110, such as at least one parameter value of at least one operation parameter of the target device 110. An exemplary modified failure solution may include, for example, repairing or replacing one or more components of the target device. Another exemplary modified solution may include allocating a maintenance technician to arrive at the scene in which the target device 110 is operated to solve the failure.

In 940, the alarming server 140 may send the one or more modified failure solutions to the target device 110 and/or the user terminal 130.

In some embodiments, the one or more modified failure solutions may be automatically applied to the target device 110, or manually applied to the target device 110 by a local user or an allocated maintenance technician.

In some embodiments, after the alarming server 140 receives the failure solving result, the alarming server 140 may determine whether to update the predetermined solution set. For example, if the one or more failure solutions applied on the target device 110 are one or more recommended failure solutions determined based on the predetermined solution set, the alarming server 140 may adjust, according to the failure solving result, a recommendation degree of the one or more recommended failure solutions corresponding to the target failure type of the failure. The at least one recommended failure solution corresponding to a specific failure type may be ranked based on their recommendation degrees in the predetermined solution set. As another example, if a modified solution is determined by the alarming server 140 or a user successfully solved the failure, the alarming server 140 may update the predetermined solution set by adding this solution as a recommended solution corresponding to the target failure type.

According to some embodiments of the present disclosure, a predetermined solution set including multiple failure types and their corresponding recommended failure solutions may be generated and maintained by the alarming server 140. When the target device 110 has a failure having a specific type, the target device 110 may autonomously determine one or more failure solutions of the failure according to the predetermined solution set. In this way, some failures can be solved timely by the target device 110 or a maintenance technician who is in proximity to the target device 110, which saves the maintenance cost, improves the maintenance efficiency, and obviates the need of allocating a remote maintenance technician to arriving at the scene in which the target device 110 is operated to solve the failure. In addition, in some embodiments, if the failure of the target device 110 cannot be solved successfully by the determined failure solution(s), the alarming server 140 may help the target device 110 to modify the failure solution(s), and update the predetermined solution set based on the failure solving result. This may facilitate the solving of the target device's failure, and improve the accuracy of the predetermined solution set.

In some embodiments, the failure detection model may be trained by the alarming server 140 using a federated learning algorithm. The federated learning algorithm is a machine learning technique that trains a model across multiple decentralized edge devices or servers holding local data samples, without exchanging them. For example, the alarming server 140 may be communicated with the target device 110 (or a first processing device related to the target device 110) and multiple reference devices (or a second processing device related to each reference device). The alarming server 140, the reference devices, and the target device 110 may form a training alliance. In the training alliance, each of the reference devices and the target device 110 may share data and/or information with the alarming server 140, but not directly share data and/or information with each other. Anyone of the target device 110 and the reference devices may initiate a training request for training a specific model, and other members in the training alliance may accept or refuse the training request. If some other members accept the training request, the specific model may be trained using data of the initiator and the other members under the supervision of the alarming server 140.

Figure 10:
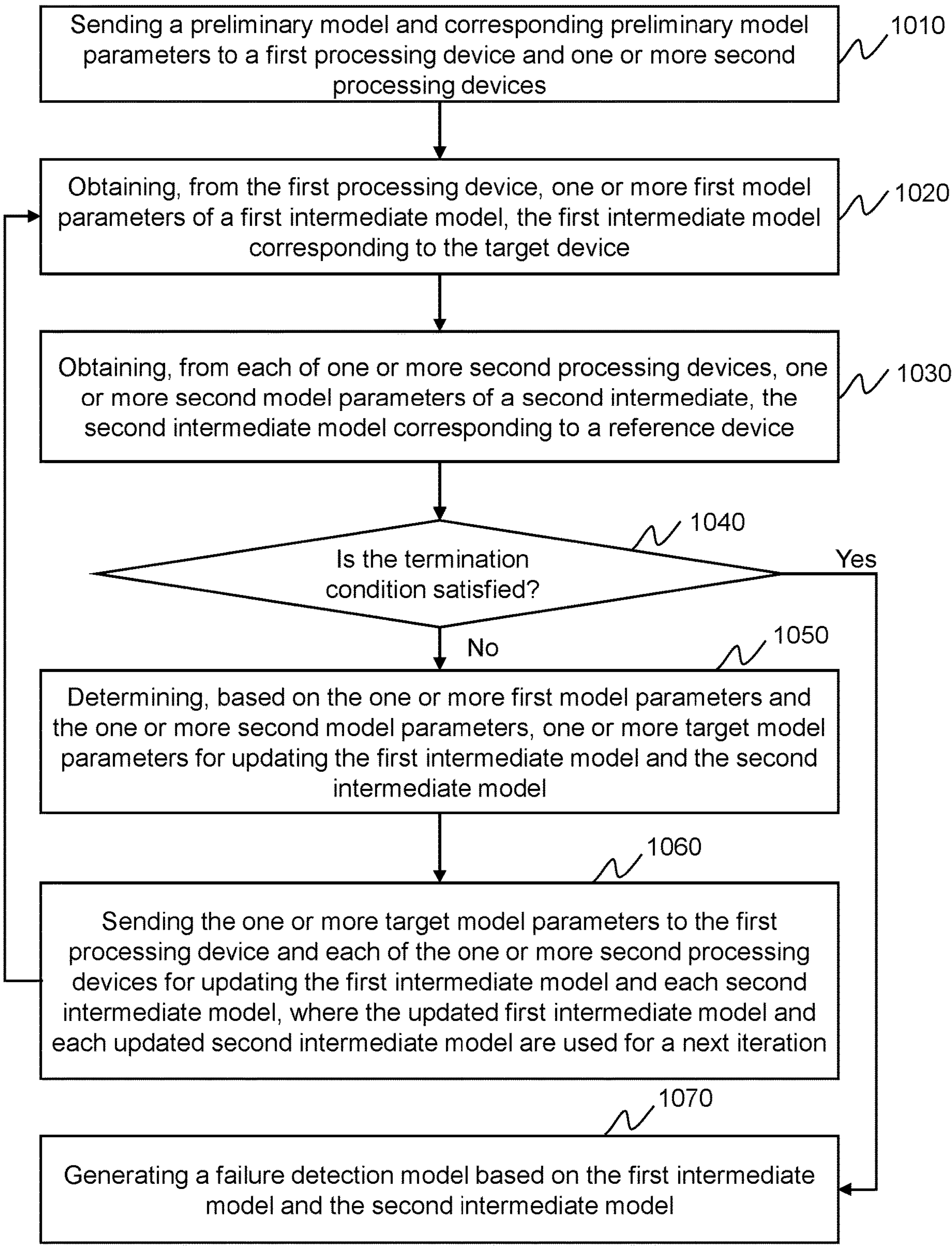
FIG. 10 is a flowchart illustrating an exemplary process for generating a failure detection model using a federated learning algorithm according to some embodiments of the present disclosure.

For illustration purposes, FIG. 10 provides a flowchart illustrating an exemplary process for generating a failure detection model using a federated learning algorithm according to some embodiments of the present disclosure. In some embodiments, one or more operations of the process 1000 may be performed by the alarming server 140 to achieve at least part of operation 520 as described in connection with FIG. 5. In some other embodiments, the process 1000 may be performed by a computing device other than the alarming server 140, such as a processing device of a vendor of the failure detection model.

In 1010, the alarming server 140 (e.g., the training module 330) may send a preliminary model and corresponding preliminary model parameters to a first processing device and one or more second processing devices.

In some embodiments, the preliminary model may be a preliminary Digital Twins model. Alternatively, the preliminary model may be a preliminary deep learning model, such as a preliminary CNN. In some embodiments, the first processing device may execute a series of training operations using a plurality of first training datasets related to the target device 110. Each of one or more second processing devices may execute the series of training operations using a plurality of second training datasets related to a reference device, wherein the reference device may be of the same type as the target device. For example, the first processing device and the target device 110 may belong to a first organization (e.g., a hospital); and the one or more second processing devices and the one or more reference device(s)

may belong to one or more second organizations that are different from the first organization. The first processing device and the one or more second processing devices may be connected to the alarming server 140.

In some embodiments, the first processing device may be integrated into the target device 110 and/or the user terminal 130 associated with the target device 110. In some embodiments, a second processing device may be integrated into a corresponding reference device and/or the user terminal 130 associated with the reference device. In some embodiments, the first processing device and the second processing device may be implemented on the computing device 200 illustrated in FIG. 2, respectively.

In some embodiments, the alarming server 140 may perform an iterative process including a plurality of iterations to generate the failure detection model based on the preliminary model. The failure detection model may be used to determine the second failure detection result (e.g., the first failure detection information) of the target device 110. For illustration purposes, the implementation of a single iteration is described hereinafter. The iteration may include the following operations.

In 1020, the alarming server 140 (e.g., the training module 330) may obtain, from the first processing device, one or more first model parameters of a first intermediate model. The first intermediate model may be the preliminary model if the current iteration is the first iteration, or the first intermediate model may be an updated preliminary model generated in a previous iteration by the first processing device if the current iteration is not the first iteration. The first intermediate model may correspond to the target device 110.

In some embodiments, the first processing device may obtain the plurality of first training datasets from the target device 110 or the alarming server 140. For example, the plurality of first training datasets may be represented as $$\{X_i^A, Y_i^A\},$$

where i refers to the $i^{th}$ first training dataset, i=1, 2, 3, . . . , n;

$$X_i^A$$

refers to one or more first sample parameter values of the $i^{th}$ first training dataset, such as a first sample parameter value of a first sample parameter (e.g., an operation parameter, a device parameter, or an environmental parameter) of the target device 110;

$$Y_i^A$$

refers to a first training label of the $i^{th}$ first training dataset, which indicates whether a failure has occurred to the target device 110 when the target device 110 operates under $$X_i^A.$$

If the current iteration is not the first iteration, the first processing device may have conducted training operations on the preliminary model using $$\{X_i^A, Y_i^A\}$$

in previous iteration(s) to obtain the first intermediate model. The model parameters of the preliminary model may have been updated to determine the one or more first model parameters of the first intermediate model.

In 1030, the alarming server 140 (e.g., the training module 330) may obtain, from each of one or more second processing devices, one or more second model parameters of a second intermediate model. A second intermediate model may be the preliminary model if the current iteration is the first iteration, or the second intermediate model may be an updated preliminary model generated in a previous iteration by the corresponding second processing device if the current iteration is not the first iteration. The second intermediate model may correspond to a reference device.

In some embodiments, a second processing device may obtain a plurality of second training datasets. For example, the plurality of second training datasets may be represented as $$\{X_i^B, Y_i^B\},$$

where i refers to the $i^{th}$ second training dataset, i=1, 2, 3, . . . , n;

$$X_i^B$$

refers to one or more second sample parameter values of the $i^{th}$ second training dataset, such as a second sample parameter value of a second sample parameter (e.g., an operation parameter, a device parameter, or an environmental parameter) of a corresponding reference device;

$$Y_i^B$$

refers to a second training label of the $i^{th}$ second training dataset, which indicates whether a failure has occurred to the reference device when the reference device operates under $$X_i^B.$$

In some embodiments, the second sample parameter(s) of the $i^{th}$ second training dataset is the same as the first sample parameter(s) of the $i^{th}$ training dataset. In some embodiments, if the current iteration is not the first iteration, each second processing device may have conducted training operations on the preliminary model using $$\{X_i^B, Y_i^B\}$$

in previous iteration(s) to obtain the corresponding second intermediate model. The model parameters of the preliminary model may have been updated to determine the one or more second model parameters of the second intermediate model.

In 1040, the alarming server 140 (e.g., the training module 330) may determine whether a termination condition is satisfied. In response to determining that the termination condition is not satisfied, the alarming server 140 may proceed to 1050, and then start another iteration by returning to 1020. In response to determining that the termination is satisfied, the alarming server 140 may proceed to 1070.

In some embodiments, the termination condition may include that the count of iterations performed by the alarming server 140 is greater than or equal to a preset iteration threshold. As another example, the termination condition may include that the value of a cost function is less than a preset value. As yet another example, the termination condition may include that the value of the cost function converges (e.g., the difference between the values of the cost function in two consecutive iterations is smaller than a threshold). The value of the cost function may be determined by the alarming server 140, and used to measure a difference between the training labels and predicted output of the first intermediate model and the second intermediate model. Merely by way of example, the alarming server 140 may determine a first value of the loss function based on the first model parameter(s) and the first training datasets, and a second value of the loss function based on the second model parameter(s) and the second training datasets. The alarming server 140 may further determine the final value of the loss function based on the first value and the second value (e.g., by summing up the first value and the second value).

In operation 1050, in response to determining that the termination condition is not satisfied, the alarming server 140 (e.g., the training module 330) may determine, based on the one or more first model parameters and the one or more second model parameters, one or more target model parameters for updating the first intermediate model and the second intermediate model.

In some embodiments, as aforementioned, the alarming server 140 may determine the value of the loss function based on the first model parameter(s) and the second model parameter(s). The alarming server 140 may further determine the target model parameters based on the value of the loss function, using, for example, a back-propagation algorithm.

In 1060, the alarming server 140 may send one or more target model parameters to the first processing device and each of the one or more second processing devices for updating the first intermediate model and each second intermediate model. For example, both the updated first intermediate model and each second intermediate model may have the target model parameter(s). The updated first intermediate model and each updated second intermediate model may be used for a next iteration.

In 1070, in response to determining that the termination condition is satisfied, the alarming server 140 may generate the failure detection model based on the first intermediate model and/or the one or more second intermediate models. For example, the first model parameter(s) of the first intermediate model and the second model parameter(s) of each second intermediate model may be averaged to determine final model parameters of the failure detection model. As another example, one of the first intermediate model and the one or more second intermediate models may be designated as the failure detection model.

In some embodiments, a plurality of failure detection models corresponding to a plurality types of devices may be generated according to the process 1000. The plurality of failure detection models may be stored in the storage device 150. When monitoring a target device of a specific type, the alarming server 140 may obtain one or more of the plurality of failure detection models that correspond to the specific type from the storage device 150.

It can be seen from the above descriptions of FIG. 11 that the failure detection model is trained based on training datasets held by the target device 110 and also the reference device(s), but the target device 110 and the reference device(s) do not need to exchange their respective training datasets in the training process. Compared with a failure detection model trained solely on the training datasets of held by the target device 110, the failure detection model trained using the federated learning algorithm may learn failure detection mechanism from more data and therefore have an improved accuracy. In addition, the data privacy of the target device 110 and the reference device(s) may be protected.

It should be noted that the above description regarding the process 500 to process 1000 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. In some embodiments, anyone of the process 500 to process 1000 may be accomplished with one or more additional operations not described, and/or without one or more of the operations discussed. Additionally, the order in which the operations of the process 500 to process 1000 and described below is not intended to be limiting.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "module," "unit," "component," "device," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB. NET, Python or the like, conventional procedural programming languages, such as the "C" programming language, Visual Basic, Fortran 2003, Perl, COBOL 2002, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claim subject matter lie in less than all features of a single foregoing disclosed embodiment.

What is claimed is:

1. A method for failure warning of a medical imaging device, implemented on an alarming server that is connected to a target device and a user terminal, comprising:

obtaining, from the target device, log information including a first failure detection result and one or more first parameter values of one or more operation parameters of the target device, the first failure detection result being generated by the target device and indicating whether the target device has a failure, the first failure detection result indicates that the target device has the failure only after the failure actually occurs and/or the target device breaks down;

determining, based on the one or more first parameter values, a second failure detection result regarding the target device via the alarming server using a failure detection model, the second failure detection result including first failure detection information indicating whether the failure is likely to occur to the target device which is currently operating in a normal state or second failure detection information indicating whether the failure has occurred to the target device, wherein the failure detection model is obtained using a federated learning algorithm, and the failure detection model is generated by the alarming server by performing an iterative process including a plurality of iterations, at least one iteration of the plurality of iterations comprising:

obtaining, from a first processing device, one or more first model parameters of a first intermediate model, the first intermediate model corresponding to the target device;

obtaining, from each of one or more second processing devices, one or more second model parameters of a second intermediate model, the second intermediate model corresponding to a reference device, and a type of the reference device being the same as a type of the target device;

determining, whether a termination condition is satisfied; and in response to determining that the termination condition is not satisfied, determining, based on the one or more first model parameters and the one or more second model parameters, target model parameters for updating the first intermediate model and the second intermediate model to be used in a next iteration; and sending, to the user terminal, a failure analysis report regarding the target device based on the first failure detection result and the second failure detection result.

2. The method of claim 1, wherein the sending, to the user terminal, a failure analysis report regarding the target device based on the first failure detection result and the second failure detection result includes:

generating the failure analysis report based on a priority order of the first failure detection result and the second failure detection result, wherein a priority level of the first failure detection result is higher than the second failure detection result.

3. The method of claim 1, further comprising:

obtaining a failure solving result from the target device, wherein the failure solving result is generated after one or more failure solutions for solving the failure are applied to the target device, and the one or more failure solutions are determined by the target device or a user of the target device based on failure solutions sent by the alarming server;

determining, based on the failure solving result, whether the failure has been successfully solved;

in response to determining that the failure has not been successfully solved, determining one or more modified failure solutions for solving the failure; and sending the one or more modified failure solutions to at least one of the target device or the user terminal.

4. The method of claim 3, wherein the one or more failure solutions are determined by the target device based on a predetermined solution set including a plurality of failure types and their corresponding recommended failure solutions; and the method further comprises:

determining, from the plurality of failure types, a target failure type corresponding to the failure of the target device; and updating, based on the failure solving result, the recommended failure solution of the target failure type in the predetermined solution set.

5. The method of claim 1, further comprising:

obtaining a plurality of candidate failure detection models corresponding to different environment types;

determining a target environment type of an application environment of the target device; and selecting a candidate failure detection model corresponding to the target environment type as the failure detection model for determining the second failure detection result.

6. The method of claim 4, wherein the one or more failure solutions include at least one of means for solving the failure, one or more actions that need to be performed for solving the failure, a time point before which the failure needs to be solved, and a time duration needed for solving the failure;

the means for solving the failure include at least one of solving the failure by the target device, solving the failure by a local user of the target device, solving the failure by the alarming server, and solving the failure by a maintenance technician who is not in proximity to the target device.

* * * * *